UNITED STATES PATENT OFFICE.

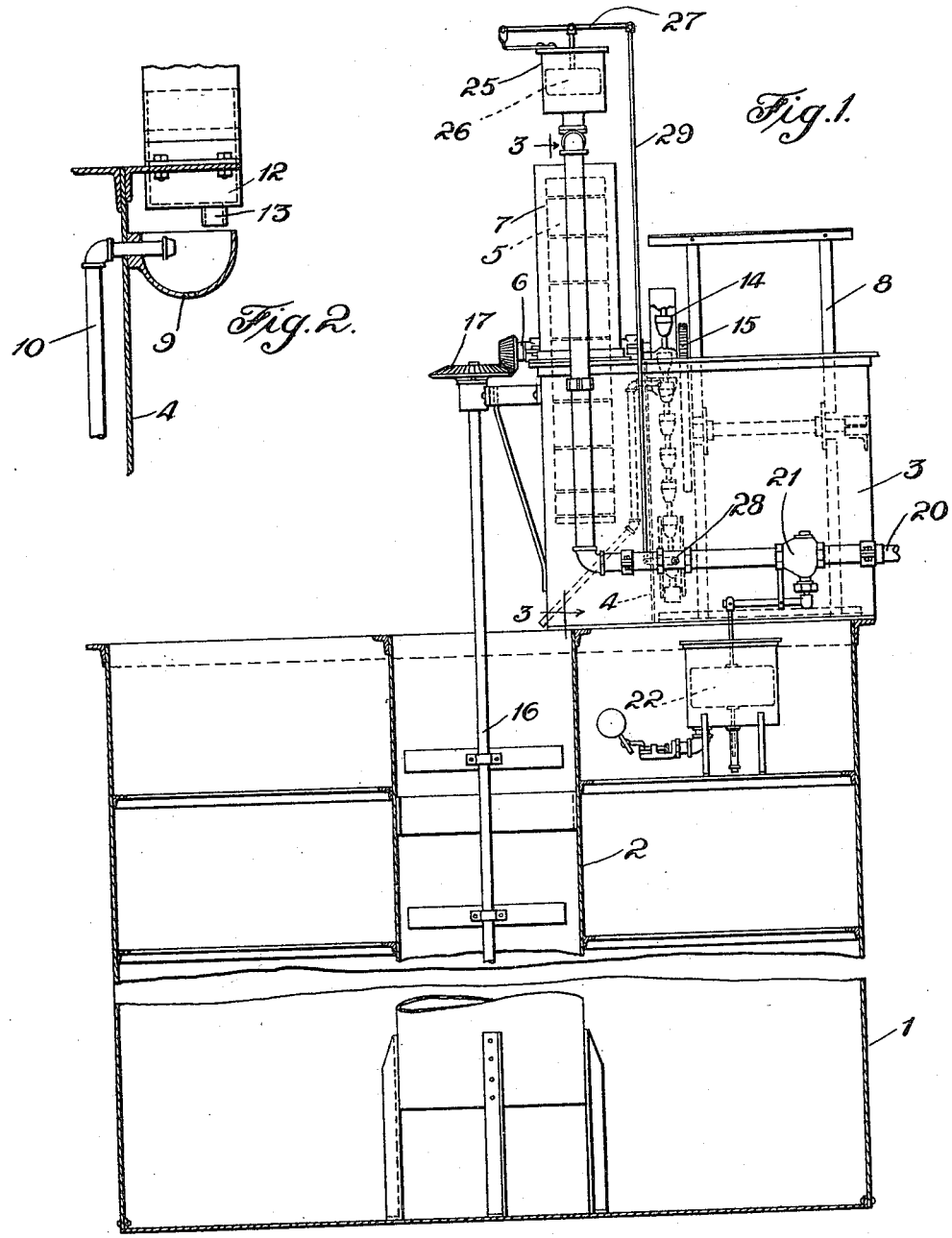

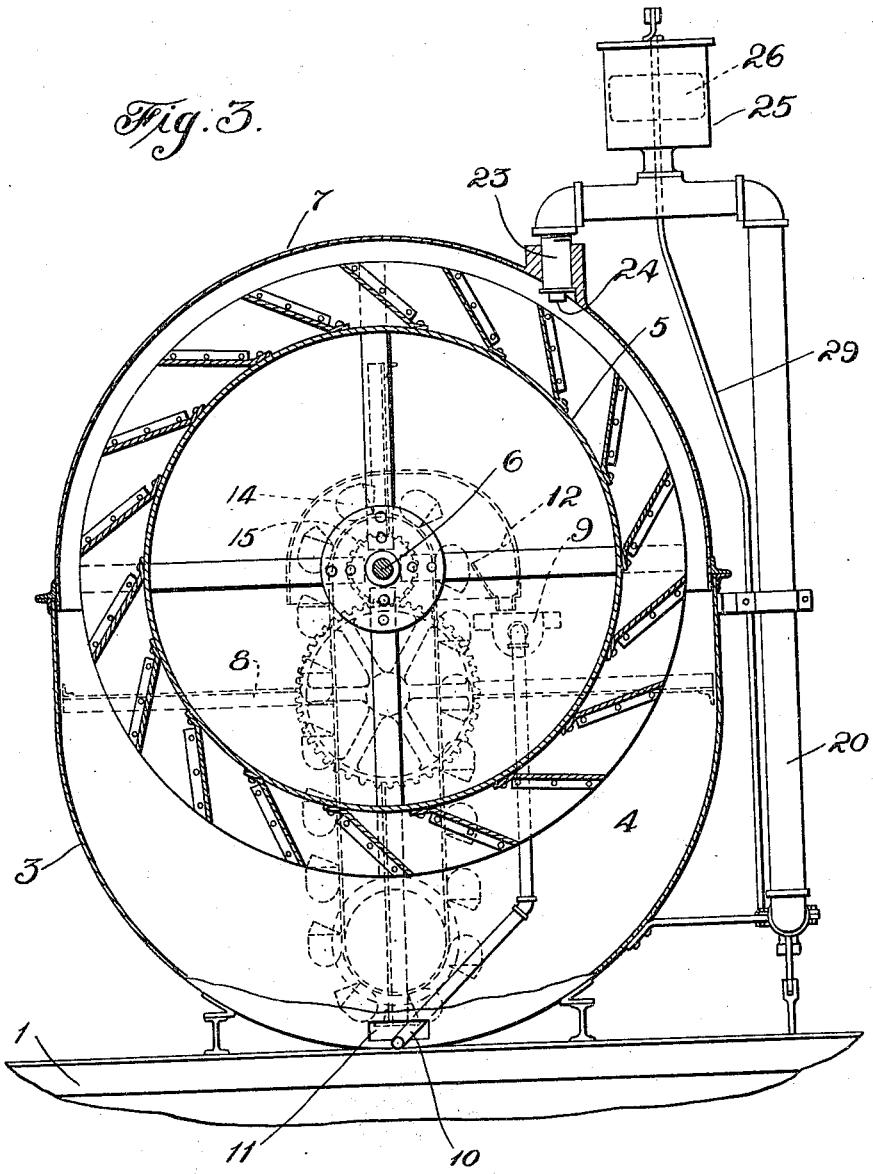

LOUIS D. KINZIG, OF DAYTON, OHIO, ASSIGNOR TO NORTHERN WATER SOFTENER CO., A CORPORATION OF MAINE.

WATER-SOFTENING APPARATUS.

1,153,931.  Specification of Letters Patent.  Patented Sept. 21, 1915.

Application filed February 6, 1914. Serial No. 816,898.

*To all whom it may concern:*

Be it known that I, LOUIS D. KINZIG, a citizen of the United States, residing at Dayton, county of Montgomery, State of Ohio, have invented a certain new and useful Improvement in Water-Softening Apparatus, and declare the following to be a full, clear, and exact description of the same, such as will enable others skilled in the art to which it pertains to make and use the same, reference being had to the accompanying drawings, which form a part of this specification.

My invention has for its object to produce a simple and efficient automatic apparatus for mixing water to be treated and a chemical in the desired proportions.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a view showing in cross section a treating and storage reservoir and in side elevation my improved mixing apparatus operatively associated with the reservoir; Fig. 2 is a view partly in section and partly in elevation of the constant head device for the chemical supply pipe; and Fig. 3 is a section taken approximately on line 3—3 of Fig. 1, on an enlarged scale.

Referring to the drawings, 1 represents a large reservoir having in the center an open ended tubular member, 2, extending from the top to a point near the bottom. Upon the reservoir is arranged a tank, 3, divided by a vertical partition, 4, into two chambers. Within one of the chambers of the tank is located a vertical water wheel, 5, conveniently mounted on a horizontal shaft, 6, supported in the bearings at the top of the tank. The upper half of the water wheel is concealed beneath a suitable hood, 7, arranged above the compartment in which the lower half of the water wheel lies. The other compartment of the tank 3 serves to hold the supply of chemical liquid which is to be added to the water to be treated. In the arrangement shown, the bottom of the tank 3 is made semi-cylindrical and there is mounted in the chemical compartment a vertical paddle wheel, 8, the paddles of which are substantially as long as the width of the compartment and the radius of which is substantially equal to the radius of the semi-cylindrical bottom of the tank. To the dividing partition in the tank is secured a cup, 9, the top of which is above the level to which the chemical in the tank rises. From this cup extends a pipe, 10, which passes down through the compartment in which the water wheel lies and extends outwardly through an opening, 11, in the side wall of this compartment, the opening 11 and the projecting end of the pipe 10 being both directly over the central tubular portion, 2, of the reservoir. The opening 11 serves also as the delivery opening for the water to be treated. The receiving end of the pipe 10 projects into the cup 9 at a point below the top so that the inlet orifice is always submerged.

Just above the cup 9 is a receptacle, 12, open at the top and having a discharge outlet, 13, emptying into the cup. On the water wheel shaft, 6, is a bucket conveyer, 14, which extends down toward the bottom of the chemical compartment of the tank 3; the conveyer lying near the partition so that the buckets will lift chemical from the chemical compartment and deliver it into the cup 9.

In addition to driving the bucket conveyer, the water wheel also drives the paddle wheel agitator, suitable gearing, 15, being provided for this purpose between the agitator and the shaft 6. The water wheel also actuates an agitator, 16, in the tubular central section 2 of the reservoir, suitable gearing, 17, being arranged between this agitator and the water wheel shaft.

The water to be treated is supplied through a pipe, 20, having therein a valve, 21, controlled by a suitable float device, 22, in the main reservoir; the float device 22 serving to shut off the water supply when the reservoir is full and to start the flow of water again when the water in the main reservoir drops to a predetermined level. The supply pipe 20 extends up past the water wheel casing and has its outlet end, 23, projecting through and supported by the casing in a position to discharge water upon the wheel and set the latter in motion. The discharge end of the supply pipe is restricted somewhat as indicated at 24. Connected to the water supply pipe at a higher elevation than the discharge orifice is a float chamber, 25, communicating with the supply pipe. In the chamber 25 is a float, 26, depending from a lever, 27, which is in turn connected to a valve, 28, in the water supply pipe by means of a rod, 29. The valve 28 is located between the valve 21 and the discharge orifice 24.

The operation is as follows: The chemical compartment of the tank 3 is filled with the chemical mixture adapted to be added to the water to be treated. Assuming the main reservoir to be empty, the float 22 will be down so that the valve 21 in the supply pipe is open. Water being allowed to enter the supply pipe, it flows through the same and is discharged upon the water wheel turning the latter. Water is supplied under enough pressure to permit it to back up into the float chamber, 25, the restricted orifice 24 serving as a reducing valve to maintain pressure in the pipe just within the orifice. When no water is flowing the valve 28 is wide open. As water enters the float chamber 25 it lifts the float 26 and begins to close the valve 28 so as to cut down the supply of water. In other words, the float device forms a very sensitive pressure regulator which will keep the pressure of the water at the discharge orifice of the water pipe practically constant so that a uniform stream of water will be kept flowing over the water wheel. As the water leaves the water wheel it flows down into the bottom of the water wheel compartment and out through the opening 11 into the tubular central portion, 2, of the main reservoir. As the water wheel rotates it also actuates the bucket conveyer for the chemical and the paddle wheel agitator. The bucket conveyer supplies chemical to the constant head cup, 9, through the receptacle 12 at a faster rate than the chemical will flow out through the pipe 10, the surplus of chemical overflowing. Consequently the constant head cup is always full so that the head between the surface of the chemical therein and the inlet orifice of the pipe 10 is constant. By having this constant head of the chemical and an orifice which is always submerged, there will be a uniform flow of chemical out of the discharge pipe 10 as long as the apparatus is operating. The pipe 10 empties into the chamber 2 of the main reservoir and mixes with the raw water, the mixture entering the main portion or chamber of the reservoir at the bottom and being required to rise in the usual way to a delivery opening at the top. Whenever the water supplied to the water wheel stops, the water wheel ceases to turn and therefore the conveyer for the chemical also comes to rest so that chemical will be supplied only during the time that water is flowing over the water wheel. When the water in the main reservoir rises to a predetermined high level it acts upon the float 22 and closes the valve 21 so that the apparatus stops working. When the water is drawn from the main reservoir to a predetermined low level, the float 22 causes the valve 21 to open again and the apparatus is again set in operation.

During the operation of the apparatus the paddle wheel agitator turns slowly, the paddles traveling in close proximity to the curved bottom of the chemical compartment and preventing the chemical from settling. Furthermore, since the paddles extend substantially the entire width of the chemical compartment, every portion of the body of chemical is agitated, so that the mixture remains uniform and does not vary in character as the supply is reduced to supply the demand. It will also be seen that by supplying the water at a constant head through an orifice of a predetermined size and also supplying chemical at a constant head through an orifice of a given size which, because it is submerged, will remain clean, perfect proportioning of the water and chemical fluid may be maintained. It will furthermore be seen that while the apparatus will proportion the water and the chemical with great accurateness, it consists of only a few strong simple parts which can not easily get out of order and which will last indefinitely, so that the apparatus requires practically no other attention than the initial adjustments and the supplying of the chemical chamber with sufficient chemical, from time to time, to keep the apparatus in operation.

While I have illustrated and described with particularity only a single preferred form of my invention, I do not desire to be limited to the exact structural details thus illustrated and described, but intend to cover all forms and arrangements which fall within the terms employed in the definitions of my invention constituting the appended claims.

I claim:

1. In a water treating apparatus, a water supply pipe, means for maintaining a constant head at the discharge orifice in said pipe, a chemical supply pipe, and means controlled by the discharged water for maintaining a constant head of chemical in the chemical supply pipe.

2. In a water treating apparatus, a water wheel, a water supply pipe delivering water to the wheel, means for maintaining a constant head in the aforesaid pipe, a chemical supply pipe, a cup surrounding the inlet end of the chemical supply pipe and having its mouth lying above the highest point of said inlet end, and means for supplying chemical to said cup at a rate in excess of the rate of flow through the chemical pipe.

3. In a water treating apparatus, a water chamber having a discharge orifice, a chemical chamber lying in proximity to the water chamber, a water wheel in said water chamber, a chemical conveyer in said chemical chamber, a driving connection between the water wheel and the chemical conveyer, a cup in position to receive chemical from the conveyer and having a submerged delivery orifice, and a constant-head device for supplying water to the water wheel.

In testimony whereof, I sign this specification in the presence of two witnesses.

LOUIS D. KINZIG.

Witnesses:
WM. F. FRENDENREICH,
RUTH E. ZETTERVALL.

Copies of this patent may be obtained for five cents each, by addressing the "Commissioner of Patents, Washington, D. C."